US010547594B2

(12) United States Patent
Chang et al.

(10) Patent No.: US 10,547,594 B2
(45) Date of Patent: Jan. 28, 2020

(54) SYSTEMS AND METHODS FOR IMPLEMENTING DATA COMMUNICATION WITH SECURITY TOKENS

(71) Applicant: DomaniCom Corporation, Shelton, CT (US)

(72) Inventors: Sin-Min Chang, Shelton, CT (US); Santanu Das, Shelton, CT (US)

(73) Assignee: Domanicom Corporation, Shelton, CT (US)

( * ) Notice: Subject to any disclaimer, the term of this patent is extended or adjusted under 35 U.S.C. 154(b) by 0 days.

(21) Appl. No.: 15/998,798

(22) Filed: Aug. 16, 2018

(65) Prior Publication Data

US 2019/0058697 A1  Feb. 21, 2019

Related U.S. Application Data

(60) Provisional application No. 62/547,067, filed on Aug. 17, 2017.

(51) Int. Cl.
| | | |
|---|---|---|
| *H04L 29/06* | (2006.01) | |
| *H04L 9/32* | (2006.01) | |
| *H04W 12/06* | (2009.01) | |
| *H04W 12/02* | (2009.01) | |

(52) U.S. Cl.
CPC ........ *H04L 63/0428* (2013.01); *H04L 9/3247* (2013.01); *H04L 63/168* (2013.01); *H04W 12/02* (2013.01); *H04W 12/06* (2013.01); *H04L 63/0272* (2013.01); *H04L 63/068* (2013.01); *H04L 2209/38* (2013.01)

(58) Field of Classification Search
CPC . H04L 63/0428; H04L 9/3247; H04L 63/068; H04L 63/168; H04L 63/0272; H04L 2209/38; H04W 12/02; H04W 12/06
See application file for complete search history.

(56) References Cited

U.S. PATENT DOCUMENTS

| | | | | |
|---|---|---|---|---|
| 9,473,304 B1 * | 10/2016 | Dixon | ................... | G06F 21/335 |
| 9,654,483 B1 * | 5/2017 | Benson | ................ | H04L 63/108 |
| 10,102,265 B1 * | 10/2018 | Madisetti | .............. | H04L 9/3247 |
| 2002/0178250 A1 * | 11/2002 | Haartsen | ............. | H04L 12/4015 |
| | | | | 709/223 |
| 2006/0288208 A1 | 12/2006 | Dashora et al. | | |

(Continued)

OTHER PUBLICATIONS

International Search Report and Written Opinion of the International Searching Authority dated Nov. 19, 2018, issued in connection with International Application No. PCT/US18/00304, filed on Aug. 17, 2018, 10 pages.

*Primary Examiner* — Techane Gergiso
(74) *Attorney, Agent, or Firm* — McDonnell Boehnen Hulbert & Berghoff LLP

(57) ABSTRACT

Network endpoints performing security token procedures are disclosed and described herein. Embodiments include a first endpoint performing functions comprising: (i) receiving a service token and a traffic token via a token distribution network, (ii) using identification data for a second endpoint obtained from the service token and a key obtained from the traffic token to generate one or more packets comprising a data payload, and (iii) transmitting one or more of the generated packets to the second endpoint via a data network that is separate from the token distribution network.

20 Claims, 9 Drawing Sheets

(56) References Cited

U.S. PATENT DOCUMENTS

| | | | |
|---|---|---|---|
| 2012/0260318 A1* | 10/2012 | Fromentoux | H04L 63/0807 726/4 |
| 2014/0195688 A1* | 7/2014 | Archer | H04L 67/1012 709/226 |
| 2014/0208413 A1 | 7/2014 | Grobman et al. | |
| 2015/0106269 A1* | 4/2015 | Krishnaiahsetty | G06Q 50/01 705/44 |
| 2015/0332283 A1* | 11/2015 | Witchey | G06Q 30/018 705/3 |
| 2016/0182493 A1 | 6/2016 | Volini et al. | |
| 2017/0034172 A1* | 2/2017 | Biggs | H04L 63/08 |
| 2017/0214522 A1* | 7/2017 | Code | H04L 9/3247 |
| 2017/0262841 A1* | 9/2017 | Good | G06Q 20/385 |
| 2018/0212970 A1* | 7/2018 | Chen | H04L 63/062 |
| 2018/0246993 A1* | 8/2018 | Cronin | H04N 5/765 |
| 2018/0351741 A1* | 12/2018 | Kim | H04L 9/0891 |
| 2019/0013948 A1* | 1/2019 | Mercuri | G06Q 20/02 |
| 2019/0050949 A1* | 2/2019 | Orsini | G06Q 50/06 |
| 2019/0057211 A1* | 2/2019 | Wright | G06N 7/00 |

\* cited by examiner

SYSTEMS AND METHODS FOR IMPLEMENTING DATA COMMUNICATION WITH SECURITY TOKENS

CROSS REFERENCE TO RELATED APPLICATIONS

This application claims priority to U.S. Provisional Application 62/547,067 titled "Systems, Methods and Devices for Developing Containerized Cross-Platform IoT Applications with Token Networks and Blockchain Ledger," filed Aug. 17, 2017. The entire contents of the 62/547,067 application are incorporated herein by reference.

SUMMARY

This disclosure describes novel methods and systems for interconnecting Internet of Things (IoT) Devices, specially-configured Aggregator and Server systems among each other in a secure way for mission critical applications like Industrial Automation, Healthcare, Smart Grid Control, etc.

The Internet of Things (IoT) is the network of physical devices, vehicles, home appliances, and other items that have embedded electronics, software, sensors, actuators, and connectivity which exchange data, creating opportunities for direct integration of the physical world into computer-based systems, resulting in efficiency improvements, economic benefits, and reduced human labor.

The number of IoT devices increased 31% year-over-year to 8.4 billion in 2017 and it is estimated that there will be 30 billion devices by 2020. The global market value of IoT in terms of dollars add to the economy is projected to be $7.1 trillion by 2020.

Examples of IoT devices range from sensors like temperature and pressure sensors to more complex devices configured for monitoring air pollution to nuclear radiation as well as actuators configured controlling elevators and HVAC equipment. The systems and methods disclosed and described herein are applicable to these and many other types of IoT devices as well.

FIG. 1(a) shows a high-level overview of a typical network of IoT devices connected to and controlled by one or more servers. This typical arrangement is inherently vulnerable to Denial of Service (DOS) and Man in the Middle (MITM) type of attacks to both the IoT devices as well as the servers. The traditional approach to securing such a network architecture has been to (i) have each and every IoT device go through a certification process and (ii) secure the network links interconnecting the IoT devices and the servers using https protocol or other secure transmission schemes.

One common certification approach being used in the industry is based on the X.509 standard which is defined by the International Telecommunications Union's Standardization sector (ITU-T). While this approach is acceptable for some regular applications, it is totally inadequate for mission critical applications. To start with, in typical deployments, the X.509 certification once obtained is valid for two years, and as a result, the IoT device and the network it is connected to remain vulnerable to nefarious activity for a long time if the X.509 certificate is obtained or otherwise compromised by a bad actor. Further, any change of ownership, public key, and other attributes during this period can be cumbersome and expensive because of the X.509 procedures. The simplicity of the X.509 structure has made it very popular, but the simple structure of X.509 also renders it more vulnerable to attack than more complicated schemes.

Further, while HTTPS protocol is quite robust, it is vulnerable to attack by sophisticated hackers who usually obtain and usurp an authorized user's passwords for example to gain access to network devices and the communications between devices. While the HTTPS links are quite robust, the network structure in FIG. 1(a) is vulnerable to DoS attack, even though HTTPS is helpful in preventing a MIMT attack.

To overcome the above-described drawbacks and other shortcomings of existing IoT network schemes, the systems and methods disclosed and described herein present a new approach to IoT device certification and interconnecting IoT devices to other network devices (e.g., aggregators and servers as described herein) in a manner so that the overall IoT network is "hardened" against attack for mission critical applications.

FIG. 2 illustrates aspects of the novel approach of the systems and methods disclosed and described herein. As illustrated, system 200 includes IoT devices, aggregators, and servers that are interconnected via Internet or private links based on any wired or wireless communication protocol now known or later developed, including but not limited to Ethernet and/or 4G/5G and WiFi wireless protocols. Some embodiments employ a well establish protocol like HTTPS for actual communication among IoT devices, aggregators and services.

In contrast to traditional IoT systems, the IoT devices of the system 200 are not discoverable because the IoT devices of the presently-disclosed systems and methods do not respond to open Internet query. Instead, the IoT devices of the systems and methods herein require a "token" for communications. This token is like a certificate or other type of authorization that enables the IoT device to respond to a query originating from another certified device with a pairing token. These tokens are administered through a physically or logically separate network which is different than the network used for interconnecting the IoT devices, aggregators, and servers among each other. Using one network for distributing and administering tokens among the IoT devices and the network entities they communicate with (e.g., the aggregators and servers) and using a separate network for the actual data communications between the IoT devices and other network components improves upon prior art IoT network arrangements by making the network far more difficult for hackers to infiltrate.

In operation, the "tokens" are created by a token manager. In some embodiments, the token manager is a server connected to a separate token distribution network 206 as shown in FIG. 2. In some embodiments, the aggregators and the servers are connected to both (i) the token distribution network and (ii) the network which is used for transporting data between IoT devices and the servers and/or other network components.

There are two types of tokens involved in enforcing the security scheme: (i) service tokens and (ii) traffic tokens. Each service token and each traffic token has an expiration date/time. The service token pairs an aggregator with a server has a life time which is relatively long compared to the traffic token. The traffic token is also used for pairing one device (e.g., an aggregator) to another device (e.g., a server) but this pairing is for a particular stream of messages. The traffic token life in this scheme is measured in seconds to minutes whereas the service token life is measured in days, months, or even years, depending on the configuration. In other words, a typical traffic token expires (i.e., is no longer valid) a few seconds, minutes, or perhaps hours after being issued, whereas a typical service token expires (i.e., is no longer valid) a few days, months, or even years after being issued. In some embodiments, the expiration of a traffic token or a service token may be measured in volume of data rather than time. For example, a traffic token in some embodiments may expire after the traffic token has been used for transmitting 10 MB, 100 MB, 1 GB, or some other amount of data. Similarly, a service token in some embodiments may expire after the service token has been used for transmitting some amount of data (rather than a period of time). In still further embodiments, a traffic token and/or a service token may expire after some combination of time and data transmitted. For example a traffic token may expire 1 hour from issuance or after being used to transmit 1 GB of data, whichever occurs first.

The service token authorizes a device on the network to send and receive data to and from other authorized devices on the network. This service token can be revoked at any time, thereby rendering the device unable to send data to or receive data from other authorized devices on the network.

The scheme described in FIG. 2 is more robust and hardened against network attackers than prior art solutions because of using (a) a secure dedicated network for token administration, (b) a separate network for interconnecting devices on the network, e.g., IoT devices, aggregators, and servers and (c) two different types of tokens—a first token (i.e., the service token) associated with devices like X.509 but of limited life and easily revocable and the second token (i.e., the traffic token) pairing message streams between devices which has a limited life compared to the first token.

In some embodiments, the token administration network is implemented via a private blockchain network which makes it particularly hardened against both DoS attack and MIMT attack. Depending on security requirements, in some embodiments, the token administration network can alternatively be implemented via a VPN configuration which is not as robust against attack as a blockchain network, but robust enough for many applications. Blockchain is an open, distributed ledger that can record transactions between two parties efficiently and in a verifiable and permanent way. Blockchains which are readable by the public are widely used by cryptocurrencies. Here, using a blockchain to record the issuance of tokens to endpoint devices reduces the likelihood that a hacker could use spoofed service tokens or traffic tokens to communicate with network endpoints (e.g., an aggregator or server) or the devices connected to the Internet via the network endpoints.

The novel token concepts and the separation of the data network from the token distribution network provides far more robust security against attacks than traditional approaches even when the token distribution network is implemented via a VPN. Of course, the use of blockchain technology in the token distribution network provides a significant improvement in security compared to the use of only the VPN approach.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION OF THE DRAWINGS

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, can be arranged, substituted, combined, separated, and designed in a wide variety of different configurations, all of which are explicitly contemplated herein.

Figure 1A:
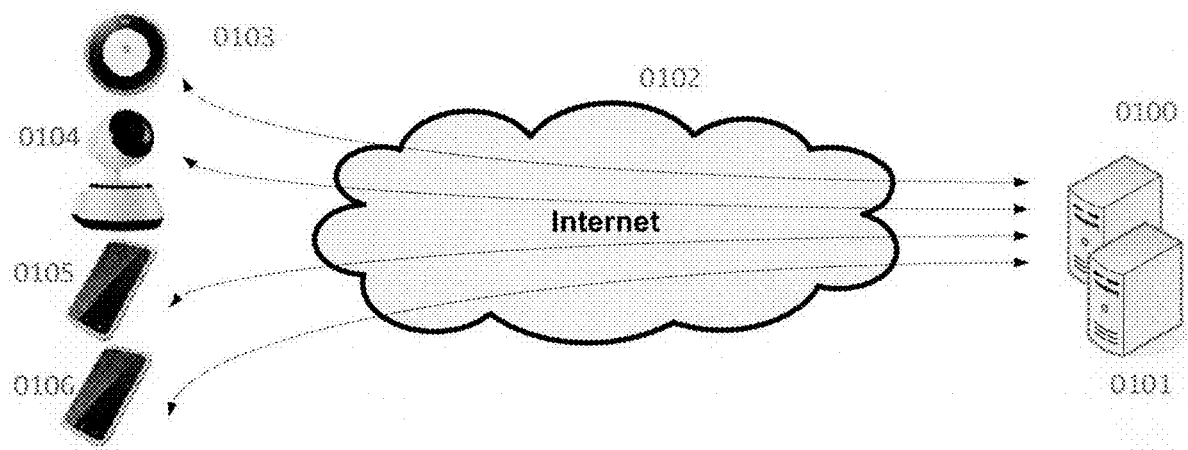
FIG. 1(a) shows an example network configuration with IoT devices connected to and controlled by a server or servers.

FIG. 1(a) shows an example network configuration 100 with IoT devices connected to and controlled by a server or servers. Configuration 100 includes one or more servers 101 in communication via the Internet 102 with one or more IoT devices, including sensors 103 and 104 and controllers 105 and 106. Configuration 100 is prone to security breach.

Figure 1B:
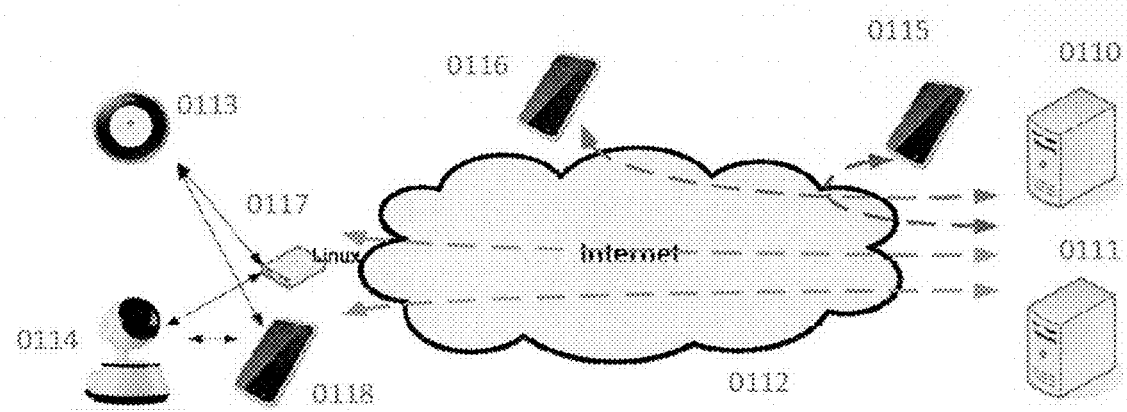
FIG. 1(b) shows an example network configuration with aggregators, according to some embodiments.

FIG. 1(b) shows configuration 100 with the addition of an IoT aggregator 117. The IoT aggregator 117 protects the IoT devices from direct exposure to other devices via the Internet 102. But as computing devices (e.g., smartphones 118 and other devices) become more powerful, they become more capable of implementing effective attacks on secure IoT networks. All interactions among the IoT devices 113-114, the aggregator 117, and the servers 110-111 are conducted via the Internet 112 alongside other traffic between other computing devices such as smart phones 118 and other devices (not shown) associated with the IoT network as well as other smartphones 115-116 and other computing devices (not shown) not necessarily associated with the IoT network.

Figure 2:
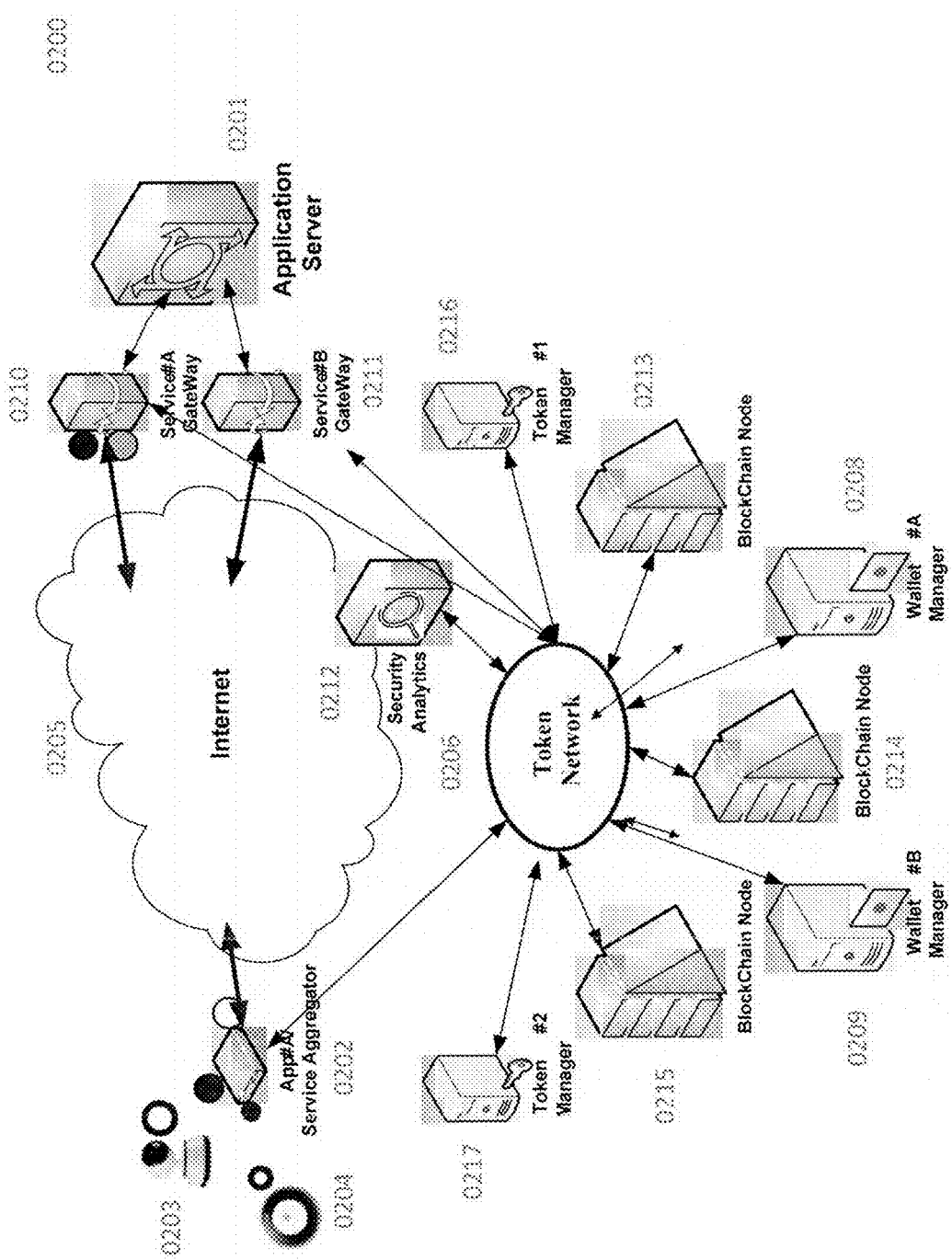
FIG. 2 shows an example network configuration using the token schemes disclosed and described herein, according to some embodiments.

FIG. 2 shows an example network configuration 200 using the token schemes disclosed and described herein according to some embodiments. Network configuration 200 includes IoT devices 203-204, a service aggregator 202 for the IoT devices, a primary token manager 216 and a secondary token manager 217, a primary wallet manager 208 and a secondary wallet manager 209, a security analytics node 212, a primary service gateway 210 and a secondary service gateway 211, and a set of blockchain nodes 213, 214, and 215.

In operation, network devices in configuration 200 use security tokens to transmit and receive data in a secure manner via the Internet 205. The network devices in configuration 200 obtain these security tokens via a token distribution network 206 that is separate from the Internet 205. In some embodiments, the token distribution network 206 is physically or at least logically separate from the Internet 205. In some embodiments, a network device in configuration 200 transmits and receives data over the Internet 205 via a first interface or port, but the network device transmits and receives security tokens (and information related to security tokens) over the token distribution network 206 via a second interface or port that is separate from the first interface or port. In some embodiments, the second interface or port is a dedicated interface or port configured for communicating with other devices via the token distribution network 206. In some embodiments, the first and second interfaces/ports are physically distinct. But in some embodiments, the first and second interfaces/ports are logically distinct interfaces on the same physical port.

Primary service gateway 210 and secondary service gateway 211 provide redundancies of communication interfaces to external networks. Some embodiments may use only a single service gateway rather than multiple service gateways. Traditionally, the service gateways 210-211 connect to the Internet 205 and/or any other communication networks for all the data and operation, administration, management (OAM) functions. In the embodiments disclosed herein, each service gateway includes (i) a first interface/port for transmitting/receiving data traffic and (ii) a second interface/port dedicated to exchanging security information (e.g. security keys and related security information) and perhaps data for other OAM functions. In some embodiments, this second interface/port can be logically or physically separate from the first interface, depending on the security objectives. Additional interfaces and ports can be used for handling different types and/or categories of network traffic. In some embodiments, the service gateways 210 and 211 can be integrated into the application server 201.

The service aggregator 202 provides network facing interfaces/ports to both the Internet 205 and the token distribution network 206. In some embodiments, this multiple interface capability can be offered by separate components in a manner similar to how the service gateways 210-211 provide multiple interfaces/ports to the Internet 205 and the token distribution network 206 for the application server 201. In the example shown in FIG. 2, both interfaces/ports are integrated within the service aggregator 202. In some embodiments, the service aggregator's 202 interface/port to the Internet 205 is physically separate from the service aggregator's 202 interface/port to the token distribution network 206. But in some embodiments, the service aggregator's 202 interface/port to the Interface is logically separate from the service aggregator's 202 interface/port to the token distribution network 206.

The token distribution network 206 is a communications network separate from the Internet 205. The network devices in configuration 200 use the token distribution network 206 for distributing tokens that are used for exchanging information via the Internet 205 in a manner that is hardened against external security attacks. An individual token comprises a set of one or more keys and/or identifications (IDs) which authenticate the source of the data to be transported or received and basic information for encryption and decryption. In some embodiments, the tokens include (i) service tokens and (ii) traffic tokens. Used together, the service tokens and traffic tokens enable the network devices in configuration 200 to exchange data and authorize and authenticate data transmissions via the Internet 205 or any other data communications network. The purposes and applications for the service tokens and traffic tokens are explained in subsequent paragraphs.

The primary wallet manager 208 and the secondary wallet manager 209 perform functions comprising identification (ID) databases and/or ID managers for the IoT devices in configuration 200, including but not necessarily limited to the application server 201, the service aggregator 202, and the IoT sensors/devices 203-204 that use tokens from the token distribution network 206 to transmit and receive data. In the example of FIG. 2, the primary and secondary wallet managers 208-209 are identical (or at least perform many of the same functions), and they synchronize their data with each other so that they can provide redundancy in the network. The wallet managers 208-209 provide information in response to queries from other servers and device managers such as the token managers 216 and 217. The information the wallet managers 208-209 provide include data about each device's interface addresses on the different networks (i.e., the device's address on the Internet and the device's address on the token distribution network) and other relevant IDs associated with the devices. In some embodiments, the wallet manager may be implemented as software function, which can be implemented using software code. In operation, the wallet manager stores account information associated with each endpoint device and maintains information like the number of accounts in an endpoint device, the endpoint device physical location, its IP address(es), information about sensors and other devices associated with the endpoints, etc. This information will be needed when a new service token pair is to be deployed to establish a new endpoint pair association by the token manager.

The primary token manager 216 and the secondary token manager 217 provide service tokens to the IoT devices in the network. In some embodiments, the token managers 216-217 also perform other functions (e.g., testing capabilities) relating to service token distribution. In some embodiments, the token manager 216-217 functions include issuing requests to network end points, e.g., service aggregator 202 and service gateways 210-211, in connection with distributing the tokens used for transmitting/receiving data and authenticating transmissions. In some embodiments, the primary token manager 216 and the secondary token manager 217 are identical (or at least perform many of the same functions), and they synchronize their data with each other to provide redundancy in the network.

The security analytics node 212 receives anomaly reports and periodic traffic statistics reports from the end points in the network, e.g., service aggregator 202 and service gateways 210-211. The security analytics node 212 is configured to detect anomalies and potential network intrusions and other tampering or hacking attempts by analyzing the reports of traffic behavior received from the nodes in the network.

Blockchain nodes 213, 214 and 215 are nodes of a blockchain network configured to provide security enhancements to the token distribution network 206 in some embodiments. In addition to privacy, the blockchain network provides improved network availability, data integrity, and transaction non-repudiation capabilities as compared to embodiments that do not implement the blockchain network. When blockchain technology is used in 206, the service token and traffic token can be implemented using a set of smart contracts deployed in the blockchain network. These smart contracts collectively specify the information to be transported across the blockchain network, the actions the token manager performs, and the endpoint device responses to the token manager actions. This effectively provides an immutable ledger for all the history of actions and their related forensics including which token managers, which endpoint devices, and which accounts did what (e.g., paired tokens, issued tokens, etc.) and at what time. The smart contracts can be written in Solidity or Go or any other suitable computer language which can be accepted by the target blockchain network. The endpoint device can perform interactions with the blockchain network using various software frameworks including but not limited to JavaScript and Python. Since blockchain networks comprise numerous identical copies of the decentralized ledger, it cannot not be easily attacked by denial of service (DOS) schemes.

In addition, some functions performed by the token managers 216-217, the wallet managers 208-209, and the security analytics node 212 can be implemented through smart contracts implemented via the blockchain network to further reduce the possibility of unwanted failures in wallet managers 208-209, the token managers 216-217, and the security analytics node 212. In addition to providing database and ledger capabilities, the blockchain network can also provide additional capabilities in connection with the functions performed by the wallet manger and token manager. When the wallet manager and token manager are implemented using a centralized server, they could still be prone to a single point failure or attack. But because of the decentralized nature of the blockchain, storing at least some of the wallet manager and token manager data in a distributed blockchain ledger makes the data less prone to a single point of failure or attack than implementations where the wallet manager and token manager data are stored in a centralized server or a small network of centralized servers. For example, some functions and features implemented in the wallet manager and token manager can be implemented using the blockchain-related smart contract language like Solidity for an Ethereum Blockchain and Go for a Hyperledger Blockchain. This will further improve the robustness of the overall service.

Figure 3:
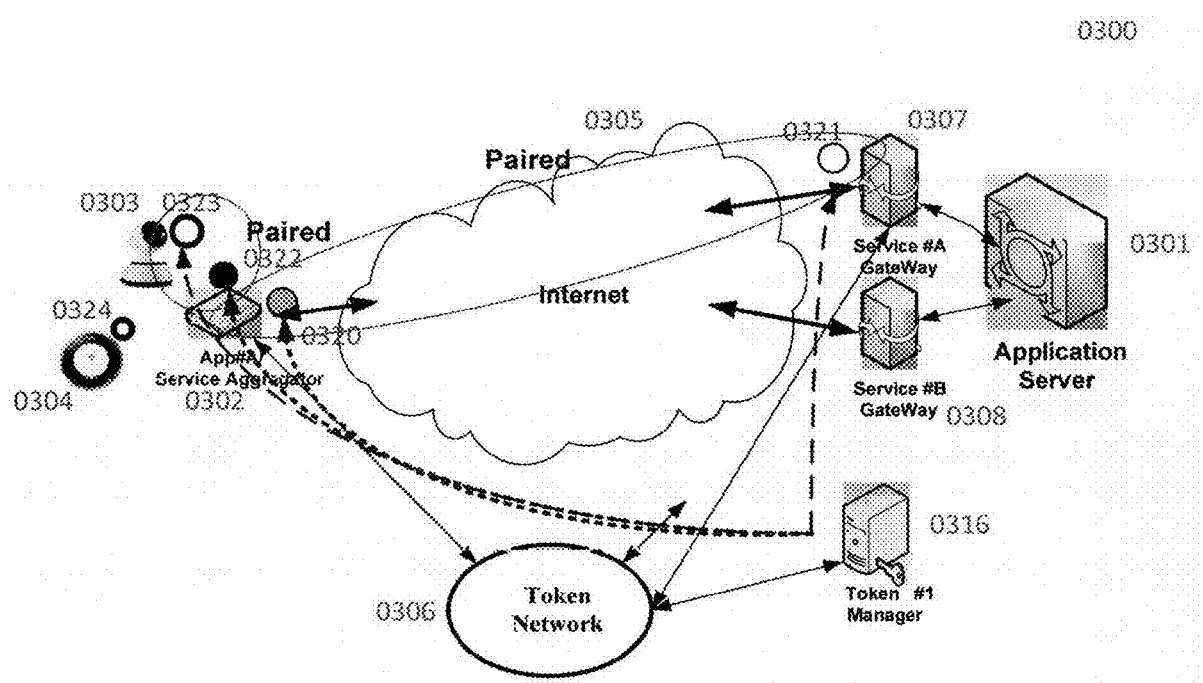
FIG. 3 shows an example of distributing a service token across a secure network (e.g., a token distribution network) according to some embodiments.
Figure 4:
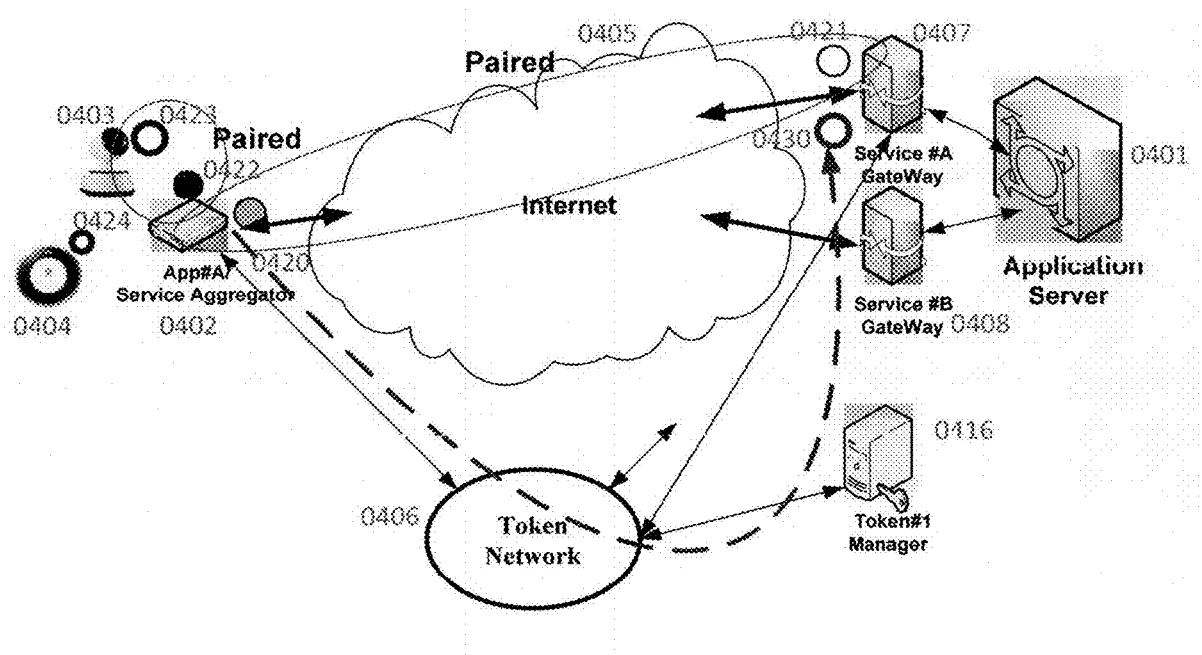
FIG. 4 shows an example of distributing a traffic token across a secure network (e.g., a token distribution network) and transmitting data across the Internet, according to some embodiments.
Figure 5:
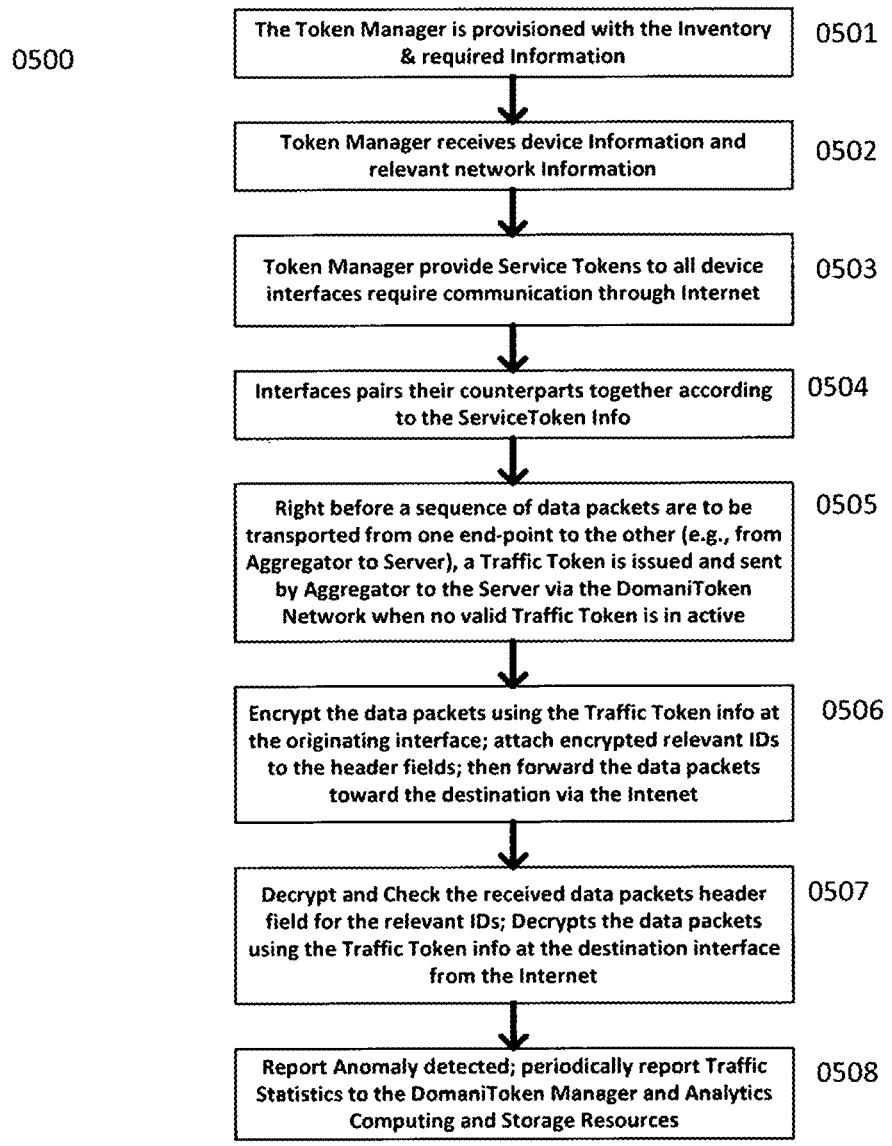
FIG. 5 shows an example method of implementing a security scheme with service tokens and traffic tokens according to some embodiments.

FIG. 3 and FIG. 4 show examples of distributing service tokens and traffic tokens, respectively, to network devices for use in transmitting data via the Internet. FIG. 5 shows an example method of implementing a security scheme with service tokens and traffic tokens according to some embodiments.

FIG. 3 shows an example configuration 300 to illustrate distributing a service token across a secure network, according to some embodiments. Configuration 300 is similar to configuration 200 (FIG. 2) except that configuration 300 focuses on the network devices involved with distributing service tokens according to some embodiments.

As explained earlier, two connections must be established to enable sensor 303 to send data to application server 301. The first connection is between sensor 303 and service aggregator 302, and the second connection is between service aggregator 302 and service gateway 307. In some embodiments, one or more (or all) functions of service aggregator 302 may be integrated with the sensor 303, and/or one or more (or all) functions of the service gateway 307 may be integrated with the application server 301.

In the embodiment shown in FIG. 3, two pairs of service tokens are provided to the IoT sensor 303, the service aggregator 302, and the service gateway 307.

The first pair of service tokens includes service token 320 and service token 321. Service token 320 is provided to service aggregator 302, and service token 321 is provided to service gateway 307. Service token 320 includes the address of service gateway 307 (the counterparty to service aggregator 302), the public key of service gateway 307, and the public and private keys for service aggregator 302. Service token 321 includes the address of service aggregator 302 (the counterparty to service gateway 307), the public key of service aggregator 302, and the public and private keys for service gateway 307.

The second pair of service tokens includes service token 322 and service token 323. Service token 322 is provided to service aggregator 302, and service token 323 is provided to IoT device 303. Service token 322 includes the address of IoT device 303 (the counterparty to service aggregator 302), the public key of IoT device 303, and the public and private keys for service aggregator 302. Service token 323 includes the address of service aggregator 302 (the counterparty to IoT device 303), the public key of service aggregator 302, and the public and private keys for IoT device 303.

These two pairs of service tokens provide traffic source identification information and secure data transport privacy and authentication for transmissions between the IoT device 303, the service aggregator 302, and the service gateway 307. For example, service token 321 at service gateway 307 and service token 320 at service aggregator 302 indicate that service aggregator 302 is allowed to send data packets to application server 301 through service gateway 307.

For example, when service aggregator 302 needs to send data to service gateway 307, service aggregator 302 generates a data packet. The data packet includes (i) an IP header portion with an IP header extension field and (ii) a data payload portion. In the IP header extension field, the service aggregator 302 places (i) a service token ID for service token 320 and (ii) a digital signature using the service aggregator's 302 private key that was in the service token 320. The service aggregator 302 encrypts the data and at least a portion of the IP header extension field (described further below) and transmits the packet to service gateway 307. The digital signature in this context is a hash value which is computed over the entire token related header extension information using a private key.

When the service gateway 307 receives the data packet, the service gateway 307 validates that service aggregator 302 sent the data packet by checking the information in IP header portion and/or IP header extension field of the packet. Using the service aggregator's 302 public key that was contained in service token 321, the service gateway 307 can authenticate the packet as having come from service aggregator 302 by confirming that the signature in the IP extension field of the IP header portion was created with the service aggregator's 302 private key. If the service gateway 307 cannot authenticate the packet has having come from service aggregator 302, then service gateway 307 discards the packet. Preferably, if the service gateway 307 discards the packet in this circumstance, the service gateway 307 does not send a notification to service aggregator 302. As a result, the Internet facing interfaces of the service gateway 307 are effectively hidden from a network scanner.

Similarly, when service gateway 307 needs to send data to service aggregator 302, service gateway 307 generates a data packet. The data packet generated by service gateway 307 includes (i) an IP header portion with an IP header extension field and (ii) a data payload portion. In the IP header extension field, the service gateway 307 places (i) a service token ID for service token 321 and (ii) a digital signature using the service gateway's 307 private key that was in the service token 321. The service gateway 307 encrypts the data and at least a portion of the IP header extension field (described further below) and transmits the packet to the service aggregator 302.

When the service aggregator 302 receives the data packet, the service aggregator 302 validates that service gateway 307 sent the data packet by checking the information in the IP header portion and/or IP header extension field of the received packet. Using the service gateway's 307 public key that was contained in service token 320, the service aggregator 302 can authenticate the packet as having come from service gateway 307 by confirming that the signature in the IP extension field of the IP header portion was created with the service gateway's 307 private key. Preferably, if the service aggregator 302 discards the packet in this circumstance, the service aggregator 302 does not send a notification to service gateway 307. As a result, the Internet facing interfaces of the service aggregator 302 are effectively hidden from a network scanner.

FIG. 4 shows an example configuration 400 to illustrate distributing a traffic token across a secure network and transmitting data across the Internet 405, according to some embodiments. Configuration 400 is similar to configurations 200 (FIG. 2) and 300 (FIG. 3) except that configuration 400 focuses on the network devices involved with distributing traffic tokens according to some embodiments.

In operation, service aggregator 402 requires a traffic token to transmit data to service gateway 407. Similarly, service gateway 407 requires a traffic token to transmit data to service aggregator 402. When service aggregator 402 needs to transmit data to service gateway 407, service aggregator 402 first checks whether there is a valid traffic token for the transmission.

If there is no valid traffic token for transmitting data to the service gateway 407, then service aggregator 402 sends a traffic token 430 to the service gateway 407 via the token distribution network 406. In some embodiments, rather than the service aggregator 402 sending the traffic token 430 to the service gateway 407, the service aggregator 402 may alternatively request that the service gateway 407 send a traffic token to the service aggregator 402. Alternatively, the service aggregator 402 may request that the token manager 416 send a traffic token to both the service aggregator 402 and the service gateway 407.

In operation, the traffic token 430 includes (i) a unique traffic token ID and (ii) one or more encryption and/or decryption keys. The encryption key carried by the traffic token 430 depends on the level of privacy/security required (or at least desired) for sending the data from the service aggregator 402 to the service gateway 407 via the Internet 405. For example, a transmission (or perhaps transmission session) with a higher privacy/security requirement can use a stronger encryption key, whereas a transmission (or perhaps transmission session) with a lower privacy/security requirement can use a lower strength encryption key. The life span of the traffic token 430 (i.e., the amount of time the traffic token is valid for use) can be set by the system (e.g., by the token manager 416). Depending on requirements for the transmission (or transmission session), the life span of the traffic token could be only a few seconds or a few minutes. However, the in some instances, the traffic token may remain valid for a few hours, a few days, a few weeks, or even as long as a few months or years. In some embodiments, the encryption key(s) in the traffic token comprise symmetric key(s).

When the service aggregator 402 needs to send a data stream to service gateway 407, the service aggregator 402 encrypts at least a portion of the payload using an encryption key contained in the traffic token 430. A payload that exceeds the maximum transmission unit (MTU), is divided into several portions, and each portion is transmitted in a separate packet. The service gateway 407 keeps the received packets in sequence (based on sequence information in the header), and once all the portions have been received, the service gateway 407 decrypts the payload using the key of from the traffic token 430 to obtain the decrypted data stream.

In some embodiments, additional security can be obtained by transporting the first or last byte or a small portion of the encrypted data payload through the token distribution network 406 instead of via the Internet 405, thus preventing any unwanted interception of the Internet transmission from having a full version of the encrypted data, i.e., the transmission intercepted via the Internet 405 would not include the portions transmitted via the token distribution network 406.

FIG. 5 shows an example method 500 of implementing a security scheme with service tokens and traffic tokens according to some embodiments. In operation, different steps of method 500 are performed by different components of the system.

Method 500 begins at step 501, where the token manager is provisioned with a network database, including but not limited to network locations or URLs, device IDs, IP addresses, and other relevant information of the network devices that participate in the token-based processes and procedures disclosed as described herein, including but not limited to one or more of the application server 401, the service gateways 407-408, the service aggregator 402, and the IoT devices 403-404. In some embodiments, the network inventory includes all the devices that the token manager will interact with to provide service tokens and/or traffic tokens to network endpoints (e.g., the IoT devices, service gateways, service aggregators, etc.) via the token distribution network (or other private network) to facilitate data transmissions via the Internet (or other public network).

Next, method 500 advances to step 502, which includes the token manager receiving or otherwise obtaining information for the specific devices between which to establish communication channels/sessions to facilitate the transmissions disclosed and described herein.

Next, method 500 advances to step 503, which includes the token manager sending service tokens to the communication endpoints (e.g., the IoT devices, service gateways, service aggregators, etc.) that will use the tokens to facilitate communications as described herein. IN operation, the token manager sends the service tokens to the endpoint devices via the token distribution network. The token distribution network may be any of the token distribution networks disclosed or described here, e.g., token distribution network 406 (FIG. 400). For example, in some embodiments, step 503 includes the token manager checking for or otherwise detecting (e.g., via queries of devices against an inventory list) devices available via the token distribution network, and sending service token pairs to endpoint devices, e.g., service aggregators, service gateways, and IoT devices. In some embodiments, the endpoint devices confirm receipt of the service tokens. In some embodiments, step 503 may also include the token manager sending one or more traffic tokens to various endpoints followed by the endpoints confirming receipt thereof; however, distribution of traffic tokens may additionally or alternatively take place later.

Next, method 500 advances to step 504, which includes the endpoint devices determining one or more other endpoint devices with which they are authorized to communicate with based on the information (e.g., device identifiers, network locations, or IP addresses, etc.) in the service tokens received from the token manager via the token distribution network. This procedure is sometimes referred to herein as the service token pairing process.

In some embodiments, the service token pairing process of step 504 includes the first endpoint sending a test message (on its own initiative, or perhaps in response to a command from the token manager) to the second endpoint via the Internet. In some embodiments, the test message includes verification data within the IP header (e.g., within the IP header extension or elsewhere within the header) or perhaps in the body of the test message. The verification data is signed with the first endpoint's private key and encrypted with the encryption key in the traffic token. In some embodiments, the verification data comprises one or more of (i) a Service Token ID, (ii) a Traffic Token ID, (iii) a Packet Sequence ID, (iv) a time stamp, and/or (v) other information that can be accommodated in the IP packet's extension header field in IPv6 or option field in IPv4. In response to receiving the test message, the second endpoint decrypts the verification data and checks the digital signature to make sure that packet was transmitted by the first endpoint. Then, the second endpoint decrypts and extracts the test message(s) and forwards the test message(s) to the token manager. In response to receiving the test message(s) from the second endpoint, the token manager checks and confirms the correct test message(s) were successfully transmitted from the first endpoint to the second endpoint via the Internet connection. And in response to determining that the first endpoint successfully transmitted the test message(s) to the second endpoint via the Internet (or other data connection), the token manager informs both the first endpoint and the second endpoint that the service token pairing process is complete.

In some embodiments, once the service token pairing process described above is complete, the first endpoint and the second endpoint are able to send and receive data to and from each other. However, in some embodiments, once the above-described service token pairing procedure is complete, only the first endpoint is able to send data to the second endpoint and the second endpoint is able to receive data from the first endpoint; however, the second endpoint may not yet be able to transmit data to the first endpoint and the first endpoint may not yet be able to receive data from the second endpoint.

In such embodiments, step 504 may additionally include the second endpoint sending a test message (on its own initiative, or perhaps in response to a command from the token manager or in response to completing the above-described service token pairing process) to the first endpoint via the Internet. Like the test message that the first endpoint sent to the second endpoint, the test message that the second endpoint sends to the first endpoint includes verification data within the IP header (e.g., within the IP header extension or elsewhere within the header) or perhaps in the body of the test message. The verification data is signed with the second endpoint's private key and encrypted with the encryption key in the traffic token. In some embodiments, the verification data comprises one or more of (i) a Service Token ID, (ii) a Traffic Token ID, (iii) a Packet Sequence ID, (iv) a time stamp, and/or (v) other information that can be accommodated in the IP packet's extension header field in IPv6 or option field in IPv4. In response to receiving the test message from the second endpoint, the first endpoint decrypts the verification data and checks the signature to make sure that packet was transmitted by the second endpoint. Then, the first endpoint decrypts and extracts the test message(s) and forwards the test message(s) to the token manager. In response to receiving the test message(s) from the first endpoint, the token manager checks and confirms the correct test message(s) were successfully transmitted from the second endpoint to the first endpoint via the Internet connection. And in response to determining that the second endpoint successfully transmitted the test message(s) to the first endpoint via the Internet (or other data connection), the token manager informs both the first endpoint and the second endpoint that the service token pairing process from the second endpoint to the first endpoint is complete.

Next, method 500 advances to step 505. At step 505, a first endpoint device (e.g., a service aggregator) determines that it has data to send to a second endpoint device (e.g., a service gateway). If there is no valid traffic token available to facilitate transmission from the first endpoint to the second endpoint, step 505 includes the first endpoint (on its own initiative, or perhaps in response to a command from the token manager) sending one or more traffic tokens to the second endpoint via the token distribution network. In some embodiments, rather than the first endpoint sending the traffic token(s) to the second endpoint, the token manager may instead transmit traffic token(s) to both the first and second endpoints.

Next, method 500 advances to step 506. Step 506 begins when the first endpoint has data (or a data stream) to transmit to the second endpoint. The first endpoint encrypts the data stream using the encryption key specified by the traffic token. If the data (or data stream) is larger than the maximum transmission unit (MTU) of the network (which will often be the case), the first endpoint fragments the encrypted data stream into segments that will comply with the MTU. Then, the first endpoint encapsulates the properly fragmented data complying with the MTU requirement for the network. Next, the first endpoint generates header extension data for adding to each packet based on the information from the traffic token and the service token to be used for transmissions to the second endpoint. The header extension data includes a signature that is signed with the first endpoint's private key. The header extension data also includes one or more of (i) the Service Token ID of the service token used for the transmission, (ii) the Traffic Token ID of the traffic token used for the transmission, (iii) the Packet Sequence ID (if the transmission is broken into multiple packets), (iv) time-stamps associated with the transmission of each packet, and/or (v) other information to be put in the IP packet's extension header field in IPv6 or option field in IPv4. Then, the first endpoint encrypts the header extension data according to the encryption key in the traffic token for the transmission. Then, the first endpoint adds the encrypted header extension data to the IP header and the data payload portion of the packet and transmits the packet to the second endpoint via the Internet (or other data communication link). In some embodiments, the first endpoint may send a few bytes of the payload to the second endpoint via the token distribution network instead through the Internet so that there is no way to collect the complete data stream by wiretapping on the Internet.

Next, method 500 advances to step 507. At step 507, the second endpoint (the receiving end) decrypts the header extension to obtain the encrypted header information (described above) and checks the signature to validate that the first endpoint (the transmitting end) was the source of the transmission. Then, the second endpoint combines the different fragments of the data (or data stream) received via the Internet and/or the token distribution network. Next, the second endpoint decrypts the recombined fragments to recover the data (or data stream) received from the first endpoint.

Next, in some embodiments, method 500 advances to step 508. At step 508, one or more of the first endpoint, second endpoint, or the token manager sends information regarding anomalies as well as transmission/networking statistics to a security analytics node (and perhaps to other devices, too). In operation, the security analytics node (e.g., security analytics node 212) analyzes the anomalies and other network statistics to identify evidence of potential network intrusions and other nefarious activity.

Figure 6:
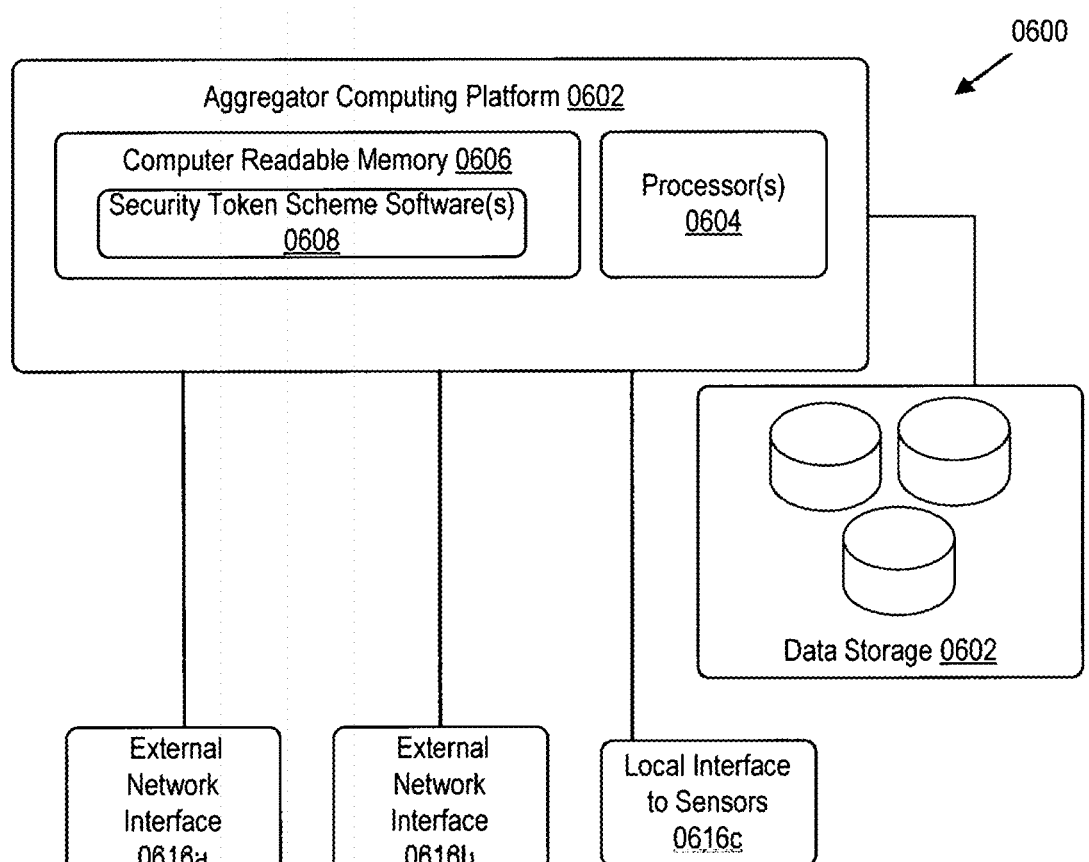
FIG. 6 shows an example aggregator device/system according to some embodiments.

FIG. 6 shows an example aggregator device/system 600 according to some embodiments. In operation the aggregator 600 is configured to perform various aspects and functions of the security token scheme shown and described with reference to FIG. 5. In some embodiments, the aggregator device/system 600 is similar to the same as the service aggregator components 202 (FIG. 2), 302 (FIG. 3), and 402 (FIG. 4).

Aggregator 600 comprises aggregator computing platform 602. Aggregator computing platform 602 comprises (i) one or more processors 604 and (ii) tangible, non-transitory computer-readable media 606. In some embodiments the tangible, non-transitory computer-readable memory 606 stores security token scheme software 608 comprising computer-executable program code. When executed by the one or more processors 604, the computer-executable program code of the security token scheme software 608 causes the aggregator 600 to perform one or more functions associated with the security token schemes disclosed and described herein, including but not limited to one or more of the features, functions, and aspects of method 500 (FIG. 5). In some embodiments, the tangible, non-transitory computer-readable media 606 stores other software that, when executed, cause the aggregator 600 to perform other aspects of the aggregator function.

In some embodiments, the aggregator 600 further comprises data storage 602, which provides data storage required for performing the security token schemes disclosed herein as well as other security token related information. Some embodiments of the aggregator 600 further comprise one or more network interfaces. In the example shown in FIG. 6, the aggregator 600 comprises external interfaces 616a and 616b. In FIG. 6, external interface 616a is an interface configurable for connecting the aggregator 600 to a main data path communication network, e.g., the Internet. And external interface 616b is an interface configurable for connecting the aggregator to the token distribution network. In some embodiments, the token distribution network could be implemented using Virtual Private Network (VPN) technology. In some embodiments, external interfaces 616a and 616b could share the same physical interface with different IP address or share the same physical interface and IP address using different sets of port IDs. In some embodiments, the external interfaces 616a and 616b could be implemented via separate physical interfaces.

In some embodiments, the aggregator 600 further comprises one or more local interfaces 616c to one or more IoT devices, such as sensors, actuators, cameras, monitors, locks, controllers, and/or other devices now known or later developed. For embodiments that employ an embedded blockchain node (e.g., certain DomaniToken applications), the blockchain node preferably can only use the interface 0616b to reach a peer blockchain node. Because each blockchain node has its own URLs including the port ID and related IP addresses locally or globally, its network ID and chain ID, it can be installed on any computing platform. Other software or service modules can interact with the blockchain node through a designated port using a designated protocol like WebSocket or Remote Procedure Call (RPC) or any other allowed protocols. These software or service modules interacting with a blockchain node can be implemented using JavaScript or Python as an example. The blockchain node also specifies how it interacts with other nodes through the interface 0616b in FIG. 6 in a peer to peer manner.

Figure 7A:
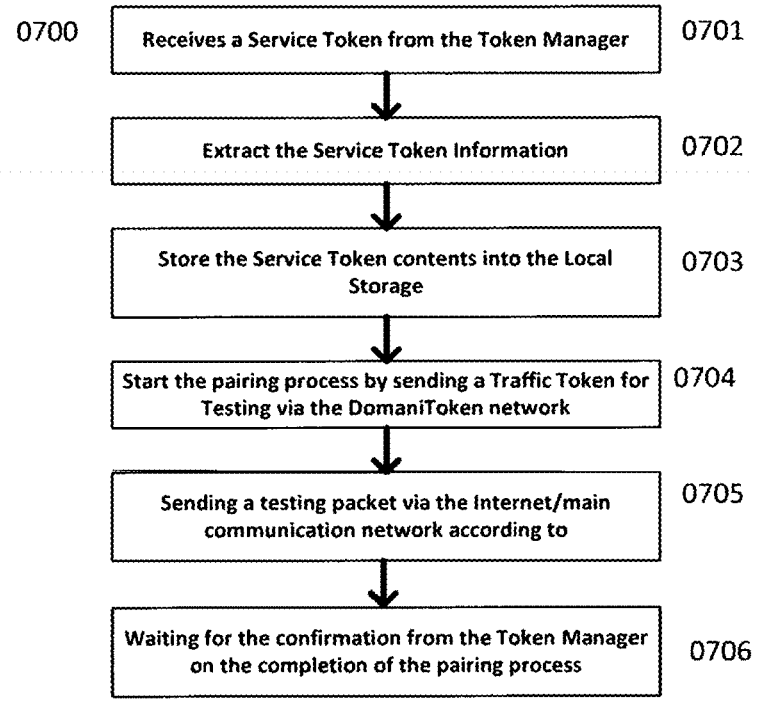
FIG. 7(a) shows an example method of receiving and processing a service token according to some embodiments.
Figure 7B:
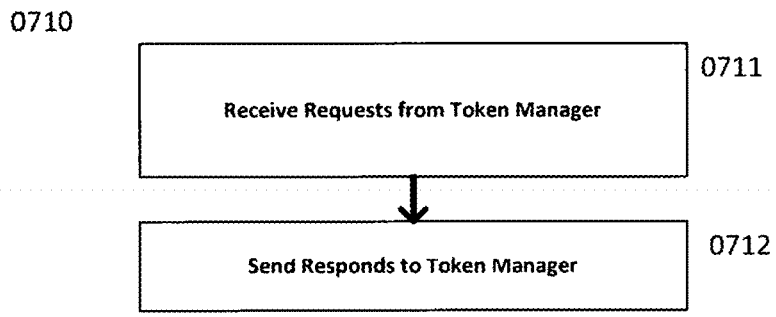
FIG. 7(b) shows an example method for Token Manager Request Handling according to some embodiments.

FIG. 7(a) and FIG. 7(b) show service token management operations according to some embodiments. In some embodiments, the service token management operations are implemented as part of the security token scheme software 608.

FIG. 7(a) shows an example method 700 of receiving and processing a service token according to some embodiments.

Method 700 begins at step 701, where a first endpoint (e.g., an IoT device, a service gateway, a service aggregator, etc.) receives a service token from a token manager (e.g., token manager 216, 316, or 416).

Next, method 700 advances to step 702, where the first endpoint extracts the service token information from the service token. As described earlier, the service token information of the service token received by the first endpoint comprises one or more of: (i) an address of a second endpoint (e.g., an IoT device, a service gateway, a service aggregator, etc.), (ii) the public key of second endpoint, and (iii) the public and private keys for the first endpoint.

After extracting the service token information from the received service token at step 702, method 700 advances to step 703 where the first endpoint stores the extracted service token information in local memory.

Next, method 700 advances to step 704, where the first endpoint initiates a pairing process. Details of the pairing process are described above with reference to FIG. 5.

Next, method 700 advances to step 705, which includes the first endpoint executing the service token pairing process. As described above with reference to FIG. 5, the service token pairing process includes the first endpoint sending a "test" traffic token to the second endpoint via the token distribution network. After sending the "test" traffic token, the first endpoint uses the "test" traffic token to send a test packet to the second endpoint via the Internet.

After using the "test" traffic token to send the test packet to the second endpoint at step 705, method 700 advances to step 706, which includes the first endpoint waiting for a confirmation that the test packet was transported to and successfully decoded by the second endpoint. In some embodiments, the first endpoint receives the confirmation from the second endpoint. In some embodiments, the second endpoint notifies the token manager (or perhaps another device), the token manager (or the other device) sends the confirmation to the first endpoint, and the first endpoint receives the conformation from the token manager (or the other device). After receiving the confirmation, the first endpoint knows that the pairing was successful and that the service token used with the test packet is valid.

In some embodiments, before the first endpoint receives the service token from the token manager, it is preferable that the token manager prove the existence of the first endpoint. In some embodiments, the token manager proves the existence/availability of the first endpoint via a query request. FIG. 7(b) shows an example method 710 for Token Manager Request Handling according to some embodiments.

Method 710 starts at step 711, where the first endpoint receives a request from the token manager. Next, method 710 advances to step 712, where the first endpoint responds to the request received at step 711, thereby informing the token manager that the first endpoint is online and available.

Figure 8A:
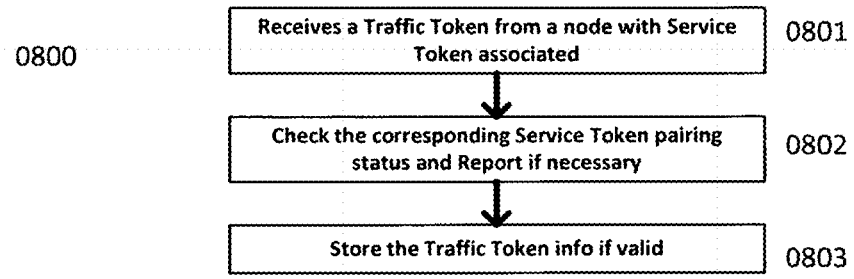
FIG. 8(a) shows an example method for receiving and processing traffic tokens during the service token pairing process according to some embodiments.
Figure 8B:
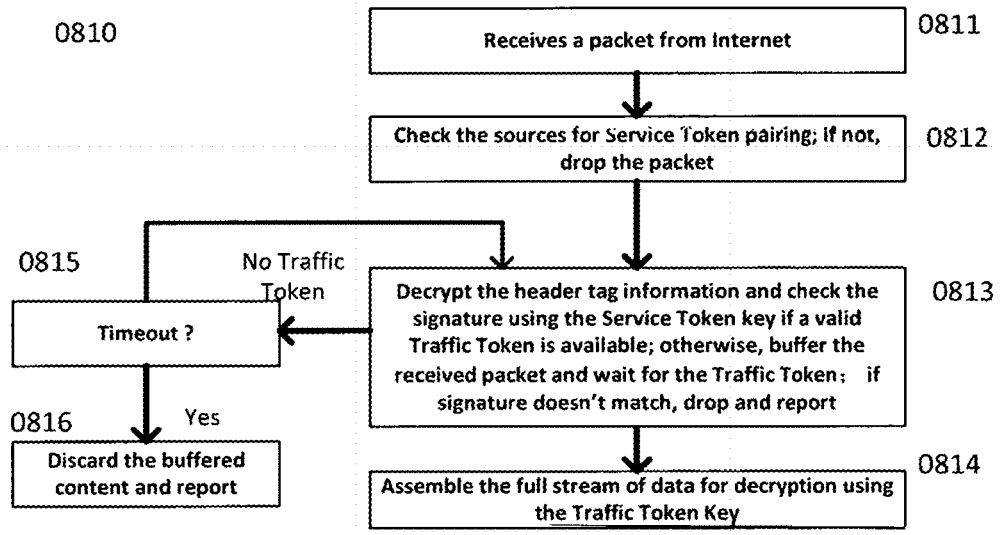
FIG. 8(b) shows an example method for receiving and processing data packets using service tokens and traffic tokens according to some embodiments.
Figure 8C:
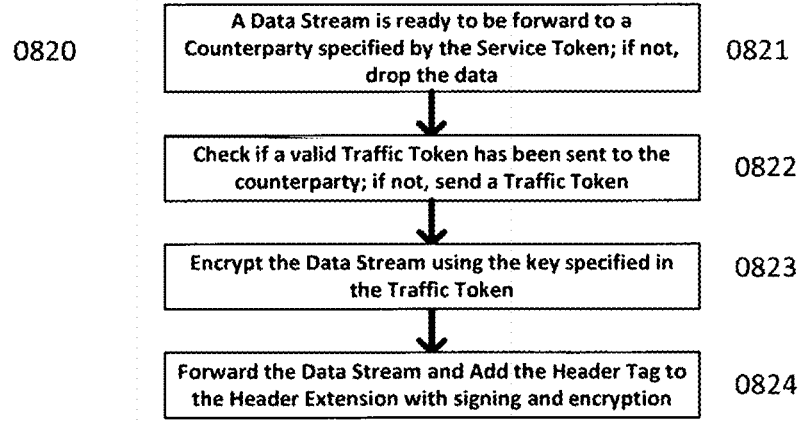
FIG. 8(c) shows an example method for transmitting data packets using service tokens and traffic tokens during a regular data stream transmission according to some embodiments.

Example traffic token functions for an endpoint (e.g., an IoT device, a service aggregator, or service gateway) are illustrated in FIG. 8(a), FIG. 8(b), and FIG. 8(c).

FIG. 8(a) shows an example method 800 for receiving and processing traffic tokens during the service token pairing process.

Method 800 starts at step 801 when a first endpoint (e.g., an IoT device, a service aggregator, or service gateway) receives a traffic token from a second endpoint via the token distribution network. As described herein, a traffic token is associated with data transmissions between the first endpoint and the second endpoint. In this regard, the traffic token received by the first endpoint at step 801 is associated with the second endpoint.

After receiving the traffic token step 801, method 800 advances to step 802, where the endpoint checks whether the second endpoint that sent to the traffic token received at step 801 has a service token associated with the first endpoint. In some embodiments, the first endpoint can check whether the second endpoint has a service token associated with the first endpoint either by querying local memory or by querying the token manager.

In some embodiments, step 802 additionally includes determining whether the first endpoint and the second endpoint are properly paired. If the first endpoint already has a service token for the second endpoint, but the first endpoint and second endpoint are not properly paired, the first endpoint may determine that the traffic token received at step 801 could be a part of the initial service token pairing process shown and described with reference to FIG. 5. If the received traffic token is part of the service token pairing process, then the first endpoint reports the service token pairing event to the token manager at step 802. Token manager at that point takes appropriate actions.

Next, method 800 ends at step 803 where the first endpoint stores the received traffic token in local memory for use with transmitting and receiving data to/from the second endpoint.

FIG. 8(b) shows an example method 810 for receiving and processing data packets using service tokens and traffic tokens according to some embodiments.

Method 810 begins at step 811, where a first endpoint (e.g., an IoT device, a service aggregator, or service gateway) receives a data packet from the main data path communication network or Internet (as opposed to the token distribution network).

Next, method 810 advances to step 812, where the first endpoint checks the source IP address in the packet header to determine whether the packet originated from a source device that the first endpoint has been previously paired with (via the pairing process described with reference to FIG. 5).

If the first endpoint determines that the source IP address does not match a source device that has been paired with the first endpoint, then the first endpoint drops the packet received at step 811. But if the first endpoint determines that the source IP address matches a source device that has been paired with the first endpoint, then method 810 advances to step 813.

At step 813, the first endpoint checks whether it has a valid traffic token for the packet received at step 811. In some embodiments, the first endpoint checks whether it has a valid traffic token by decrypting data in the IP header field (data that was inserted by the originating device) and validating a signature in the header using the public key of the originating device. In embodiments where the originator has inserted a Service Token ID and the Traffic Token ID into the header fields (decrypted by the first endpoint), step 813 may additionally include inspecting the Service Token ID and the Traffic Token ID from the header fields.

If the first endpoint determines that it does not have a valid traffic token at step 813, the first endpoint stores the received packet into a buffer storage and waits to receive a valid traffic token. If the first endpoint fails to receive a valid traffic token after some defined time period, then method 810 advances to step 815, where method 810 times out and advances to step 816 where the first endpoint discards the buffered packet and reports the anomaly to the security analytics node (e.g., node 212) or some other computer device configured to track and/or analyze anomalies for suspected nefarious network activity.

But if the first endpoint determines at step 813 that it has a valid traffic token (or if the first endpoint receives a valid traffic token before timing out at step 815), then method 810 advances to step 814, where the first endpoint processes the packet using the information in the traffic token, including but not necessarily limited to one or more decryption keys and/or other decryption information contained in the traffic token. In some embodiments, step 814 includes reassembling the payload portions of two or more received packets and decrypting the reassembled payload using a key from the traffic token.

FIG. 8(c) shows an example method 820 for generating and transmitting data packets using service tokens and traffic tokens during a regular data stream transmission.

Method 820 begins at step 821, where a first endpoint (e.g., an IoT device, a service aggregator, or service gateway) determines that it has a stream of data that is ready to be sent across the Internet to a second endpoint. In some embodiments, step 821 includes the first endpoint determining whether the first endpoint has a valid service token associated with the second endpoint to which the data is to be sent. In some embodiments, determining whether the first endpoint has a valid service token for the second endpoint comprises determining whether the first and second endpoints have previously completed the service token pairing procedure disclosed and described with reference to FIG. 5.

If the first endpoint determines that it does not have a valid service token for the second endpoint at step 821, then the first endpoint will drop the packets rather than transmitting the packets to the second endpoint. But if the first endpoint determines that it has a valid service token for the second endpoint at step 821, then method 820 advances to step 822 where the first endpoint determines whether it has a valid traffic token for transmitting data to the second endpoint.

If the first endpoint determines at step 822 that it does not have a valid traffic token for transmitting data to the second endpoint, then the first endpoint will send the second endpoint a traffic token via the token distribution network. But if the first endpoint determines at step 822 that it has a valid traffic token for transmitting data to the second endpoint (or perhaps after transmitting a new traffic token to the second endpoint via the token distribution network), then method 820 advances to step 823.

At step 823, the first endpoint (i) uses an encryption key in the valid traffic token to encrypt the data stream for transmission to the second endpoint via the Internet (or other network), (ii) encapsulates the encrypted data stream into one or more properly-sized and formatted packets, (iii) inserts the header extension data into the IP header of each packet. In some embodiments, the header extension data that the first endpoint inserts into each packet at step 823 includes (i) the Service Token ID of the service token used for the transmission, (ii) the Traffic Token ID of the traffic token used for the transmission, (iii) a Packet Sequence ID (if the encrypted data stream is broken into multiple packets), (iv) time-stamps associated with the transmission of each packet, and/or (v) other information to be put in the IP packet's extension header field in IPv6 or option field in IPv4 to facilitate transmission via the Internet using the token schemes disclosed herein.

After generating one or more packets at step 823, method 820 advances to step 824, where the first endpoint transmits the one or more packets or sequence of packets to the second endpoint via the Internet or other primary data path (as opposed to the token distribution network).

In some embodiments, step 824 may additionally or alternatively comprise the first endpoint (i) transmitting a first set of the one or more packets generated at step 823 to the second endpoint via the Internet and (ii) transmitting a second set of the one or more packets generated at step 823 to the second endpoint via the token distribution network. In some embodiments, step 824 may additionally or alternatively comprise the first endpoint (i) transmitting a portion of at least one packet generated at step 823 to the second endpoint via the Internet and (ii) transmitting another portion of the at least one packet generated at step 823 to the second endpoint via the token distribution network. As described previously, configuring the first endpoint to transmit some of the packets (or some portion(s) thereof) generated at step 823 to the second endpoint via the token distribution network prevents the full transmission from the first endpoint to the second endpoint from being intercepted on the Internet because at least a portion of the transmission travels from the first endpoint to the second endpoint via the token distribution network.

Figure 9:
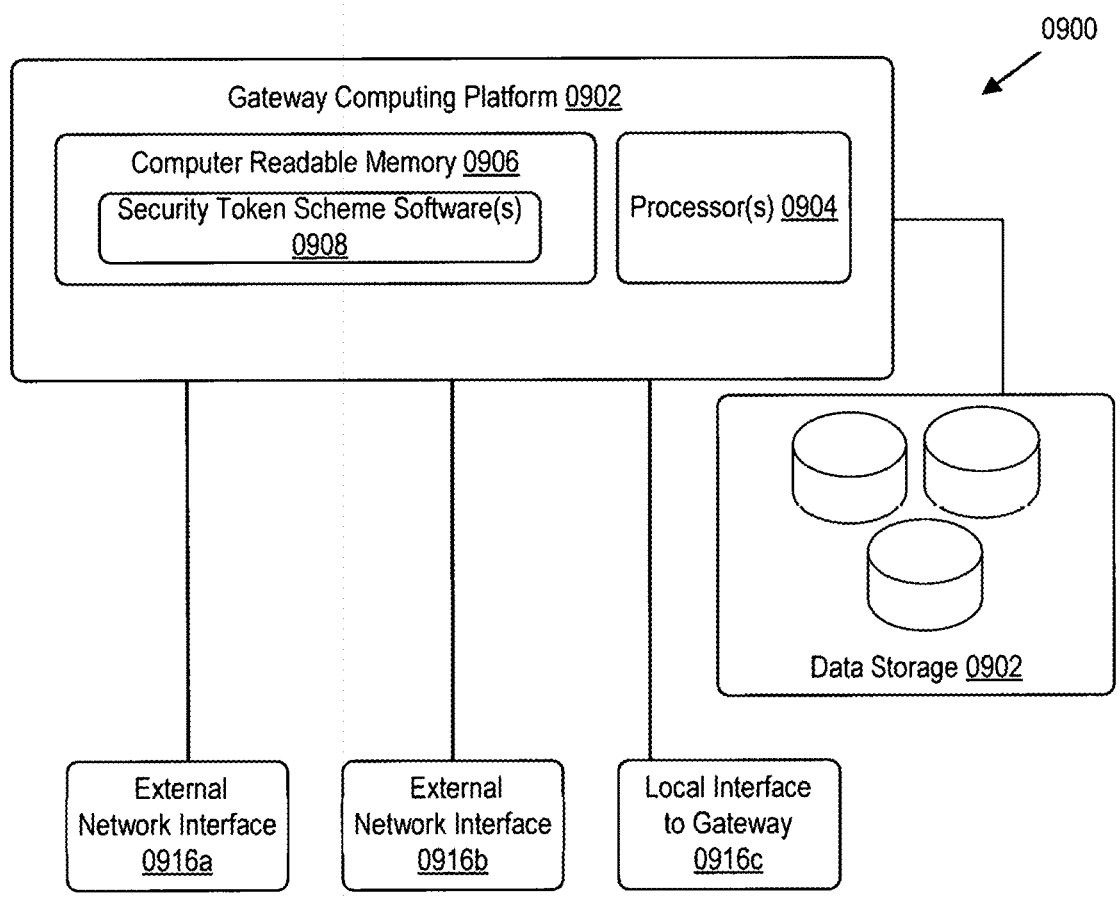
FIG. 9 shows an example service gateway device/system according to some embodiments.

FIG. 9 shows an example service gateway device/system 900 according to some embodiments. In some embodiments, the service gateway sits at an interface between an application server and the Internet, as shown in FIG. 2 (service gateways 210-211), FIG. 3 (service gateways 307-308), and FIG. 4 (service gateways 407-408).

In some embodiments, the service gateway 900 is a physical device separate from but connected to an application service. In other embodiments, the service gateway 900 is virtual device embodied as software code (e.g., running as virtual machine or any form of software implementation) executed on an application server. In operation, the service gateway 900 provides a front-end interface between the application and the Internet, and the service gateway 900 is configured to perform the token and token related functions and aspects thereof disclosed and described herein.

The example service gateway 900 comprises a gateway computing platform 902. Gateway computing platform 902 comprises (i) one or more processors 904 and (ii) tangible, non-transitory computer readable memory 906. In some embodiments, the tangible, non-transitory computer readable memory 906 stores security token scheme software 908 comprising computer-executable code. When executed by the one or more processors 904, the computer-executable code of the security token scheme software 908 causes the service gateway 900 to perform one or more functions associated with the security token schemes disclosed and described herein, including but not limited to one or more of the features, functions, and aspects of method 500 (FIG. 5). In some embodiments, the tangible, non-transitory computer readable memory 906 stores other software components which perform other software that, when executed, cause the service gateway 900 to perform other aspects of the service gateway function.

In some embodiments, the service gateway 900 further comprises data storage 902, which provides data storage required for performing the security token schemes disclosed herein as well as other security token related information.

Some embodiments of the service gateway 900 further comprise one or more network interfaces. In the example shown in FIG. 9, the service gateway 900 comprises external interfaces 0916*a* and 0916*b*. In FIG. 9, external interface 916*a* is an interface configurable for connecting the service gateway 900 to a main data path communication network, e.g., the Internet. And external interface 916*b* is an interface configurable for connecting the service gateway 900 to the token distribution network. In some embodiments, the token distribution network could be implemented using Virtual Private Network (VPN) technology. In some embodiments, external interfaces 0916*a* and 0916*b* could share the same physical interface with different IP address or share the same physical interface and IP address using different sets of port IDs. In some embodiments, the external interfaces 0916*a* and 0916*b* could be implemented via separate physical interfaces.

In some embodiments, the service gateway 900 further comprises one or more local interfaces 616*c*. In some embodiments, the local interface(s) 616*c* may be used for connecting the service gateway 900 to an application server. For embodiments that employ an embedded blockchain node (e.g., certain DomaniToken applications), the blockchain node preferably can only use the interface 0916*b* to reach a peer blockchain node. As each blockchain has its own URLs including the port ID and related IP addresses locally or globally, its network ID and chain ID, a blockchain node can be installed on any computing platform. Other software or service modules can interact with the blockchain node through a designated port using a designated protocol such as WebSocket or Remote Procedure Call (RPC) or any other allowed protocol. These software or service modules interacting with the blockchain node can be implemented using JavaScript or Python as an example. The Blockchain node also specifies how it interacts with other nodes through the interface 916*b* in FIG. 9 in a peer to peer manner.

As described throughout the present disclosure, the service gateways (e.g., any of the service gateways 210-211, 307-308, 407-408, and 900) and the service aggregators (e.g., any of the service aggregators 202, 302, 402, and 600) are considered to be and referred to as endpoints. As such, any of the functions described herein as being performed by an endpoint can be performed by either a service gateway or a service aggregator. For example, a service gateway can perform any (or all) of the endpoint functions described with reference to FIG. 7(*a*), FIG. 7(*b*), FIG. 8(*a*), FIG. 8(*b*) and FIG. 8(c). Similarly, a service aggregator can perform any (or all) of the endpoint functions described with reference to FIG. 7(a), FIG. 7(b), FIG. 8(a), FIG. 8(b) and FIG. 8(c). In this manner, the token management and operation schemes are symmetric to both endpoints devices of the communication channel, and the same scheme can be implemented and deployed by a service gateway as well as a service aggregator.

Example Configurations and Alternative Arrangements

On example configuration includes a system for interconnecting a plurality of IoT devices to servers over communication networks, where the system comprising: (i) a plurality of servers executing system control, operation and management functions, the servers coupled to two wide area communication networks and having one or more server processors, a server storage device, one or more server communication interfaces; and (ii) one or more aggregator nodes, each of the one or more aggregator nodes coupled to two wide area communication networks and coupled to a number of IoT devices using wired or wireless links, each of the one or more aggregator nodes executing aggregator node software functions, wherein each aggregator node includes one or more node processors, one or more node storage devices, and one or more node communication interfaces.

In some embodiments, each IoT device is connected to an aggregator node using a wired or wireless link, and each one of the IoT devices executes device control functions wherein each IoT device includes one or more control processors and one or more storage devices.

In some embodiments, the first of the two wide-area communication networks (i) interconnects aggregator nods and server nodes using wired or wireless means and (ii) transports data from aggregators to servers and vice versa.

In some embodiments, the second wide-area communication network (i) interconnects aggregators nodes and server nodes using wired or wireless means to a token manager and (ii) transports security tokens from server nodes to aggregator nodes and vice versa.

In some embodiments, service tokens are generated by the token manager connected to the second wide-area communication network and the traffic tokens are generated by the server nodes and the aggregator nodes.

In some embodiments, service tokens are distributed to the server nodes and aggregator nodes by the token manager through the second wide-area communication network.

In some embodiments, the traffic tokens are generated by server nodes and aggregator nodes and distributed to the server nodes and the aggregator nodes through the second wide-area communication network.

In some embodiments, the traffic tokens are generated to initiate data transport through the first wide-area communication network from aggregator nodes to server nodes and vice versa.

In some embodiment, the IoT devices are connected to the aggregator nodes using standard wired communication protocols and wireless communication protocol. The wired protocols may be any one or more of Ethernet, VLAN, USB, Serial PCI, or any other suitable wired protocol now known or later developed. And the wireless protocols may be any one or more of Bluetooth, Bluetooth Low Energy (BLE), Zigbee, Z-wave, WiFi, Low Power WiFi, or any other suitable wireless protocol now known or later developed.

In some embodiments, the aggregator nodes are connected to the first and the second wide-area networks using Carrier Ethernet, WiFi, 3G, 4G LTE, 5G or any other suitable communications protocol now known or later developed. And in some embodiments, the server nodes are connected to the first and second wide-area networks using Carrier Ethernet, WiFi, 3G, 4G LTE, and 5G or any other suitable communications protocol now known or later developed.

In some embodiments, the first wide-area network could be based on Internet, leased lines, or VPN or any other suitable network configuration. And in some embodiments, the second wide-area network is based on a Blockchain based and/or VPN based network configuration or any other suitable network configuration.

In some embodiments, the token manager node comprises a plurality of processors executing one or more token management and control functions, comprising: (i) authenticating IoT devices, aggregators, and servers; (ii) creating service tokens for IoT devices, aggregators, and servers; (iii) administering service token life spans for IoT devices, aggregators, and servers; (iv) administering service token renewals, and revocations for IoT devices, aggregators, and servers; (v) administering the paring of service token and the associated keys to the aggregator-server pairs; (vi) administering the notification of the creation of a service token pair linking an aggregator with a server, wherein the notification is sent to both the aggregator and the server involved in the pairing wherein a service token is created on response from both the aggregator and the server acknowledging the reception of the notification, wherein the aggregator and the server acknowledge the reception of the service token pairing the aggregator with the server; (vii) administering the notification of the revocation of a service token pair linking an aggregator with a server, wherein the notification is sent to both the aggregator and the server involved in the pairing wherein a response from either the aggregator or the server confirms the revocation, wherein the absence of a response from either creates a system alarm to the human administrator and the IoT network; and (viii) aggregator and the server of a service token pair reporting to token manager statistics pertaining to the number of packets exchanged between the pair and the number of traffic tokens involved in these data transfers.

In some embodiments, the aggregators and servers comprise a plurality of processors executing one or more token management and control functions, comprising: (i) creating traffic tokens for aggregator-server pairs for initiating data transfer from an aggregator to a server and for initiating data transfer from a server to an aggregator wherein the encryption key for data transfer from aggregator to server could be different for data transfer from the server to the aggregator; (ii) administering the life span of a traffic token pairing an aggregator to a server or a server to an aggregator; (iii) embedding service token id, traffic token id and a packet sequence id in the header of each data packet from aggregator to server or server to aggregator; and (iv) each data packet being checked for correct service token id, traffic token id and packet sequence id and creating an alarm notification to the token manager in case of any mismatch.

In some embodiments, the aggregator and the server functions include the functional signature associated with each IoT device, where the signature is generated by a machine learning or Artificial Intelligence (AI) based function in the aggregator and the server, wherein both the aggregator and the server are configured for checking the behavior pattern of an IoT device by matching it against one or more signatures to detect anomalous behavior of the IoT device.

In some embodiments, the functional signature function includes elements comprising one or more of (i) time series data regarding the behavior of the IoT device wherein the time series includes the average of reading of last T time periods, the average reading of T time periods of the device during the similar historical periods, standard deviation of the last readings compared with the average of last T time periods and similar historical time periods; and (ii) comparing the current reading against the historical data and the expected value creating an alarm if the deviation is above a threshold signifying the malfunctioning and/or tampering and/or security breach of the IoT device.

In some embodiments, the second wide-area communication network comprises a token manager node configured to perform security, system control, system management and alarm, and other notification functions. Some embodiments use blockchain technology to link the token manager node with aggregator and server nodes, wherein the token manager node interacts with a blockchain based smart contract to perform token distribution, system control, system management and alarm, and other notification functions. In some embodiments, the aggregator function might be absorbed in one of the sensors or in all the sensors. In a further aspect, the aggregator node might be also referred to as "cluster head" or a "sink node".

In some embodiments discussed herein, the use of various aspects of IP protocol have been discussed (e.g., IP addresses, IP header, IP extension header, IP header option field). It should be noted, however, that the IP protocol have been referenced for explanatory purposes and are not intended to be limiting. For example, in other embodiments, other protocol (e.g., 6LowPAN) can be used in this context as well.

In some embodiments, the second wide-area communication network comprises a smart contract deployed on a blockchain network wherein security, system control, system management and alarm and other notification functions are embedded in the one or more smart contracts deployed in one or more (or all) the aggregator nodes and server nodes, wherein aggregator nodes are configured to access the blockchain function through one or more other nodes.

While particular aspects and embodiments are disclosed herein, other aspects and embodiments will be apparent to those skilled in the art in view of the foregoing description. For example, while the embodiments and examples are described with respect to certain network configurations and devices/components, the disclosed systems and methods are not so limited and may be applicable to a broad range of network configurations and devices/components. The various aspects and embodiments disclosed herein are for illustration purposes only and are not intended to be limiting, with the true scope and spirit being indicated by the following claims.

What is claimed is:

1. Tangible, non-transitory computer-readable media comprising instructions encoded therein, wherein the instructions, when executed by one or more processors, cause a first endpoint to perform a method comprising:
   receiving a service token via a token distribution network, wherein the service token comprises identification data for a second endpoint;
   receiving a traffic token via the token distribution network, wherein the traffic token comprises a key required for data communications between the first endpoint and the second endpoint;
   determining that a requirement exists to transmit a data payload from the first endpoint to the second endpoint; and
   in response to determining that the requirement exists to transmit the data payload from the first endpoint to the second endpoint, using the identification data for the second endpoint in the service token and the key from the traffic token to generate one or more packets comprising the data payload, wherein an individual packet comprises an IP header, encrypted header extension data, and at least a portion of an encrypted data payload, wherein the encrypted data payload comprises data intended for the second endpoint; and
   transmitting one or more of the generated packets to the second endpoint via a data network that is separate from the token distribution network.

2. The tangible, non-transitory computer-readable media of claim 1, wherein the method further comprises:
   in response to determining that the requirement exists to transmit the data payload from the first endpoint to the second endpoint, additionally determining whether the traffic token comprising the key required for data communications between the first endpoint and the second endpoint has not expired;
   in response to determining that the traffic token comprising the key required for data communications between the first endpoint and the second endpoint has not expired, using the identification data for the second endpoint in the service token and the key from the traffic token to generate the one or more packets comprising the data payload; and
   in response to determining that the traffic token comprising the key required for data communications between the first endpoint and the second endpoint has expired, transmitting a new traffic token to the second endpoint via the token distribution network.

3. The tangible, non-transitory computer-readable media of claim 1, wherein the method further comprises:
   in response to determining that the requirement exists to transmit the data payload from the first endpoint to the second endpoint, additionally determining whether the service token comprising the identification data for the second endpoint has not expired or been revoked;
   in response to determining that the service token comprising the identification data for the second endpoint has not expired or been revoked, using the identification data for the second endpoint in the service token and the key from the traffic token to generate the one or more packets comprising the data payload; and
   in response to determining that the service token comprising identification data for the second endpoint has expired or been revoked, sending a notification to a token manager via the token distribution network, wherein the notification is related to the determination that the service token has been expired or revoked.

4. The tangible, non-transitory computer-readable media of claim 1, further comprising:
   executing one or more token pairing procedures under control of a token manager associated with the token distribution network.

5. The tangible, non-transitory computer-readable media of claim 1, wherein transmitting one or more of the generated packets to the second endpoint via a data network that is separate from the token distribution network comprises:
   transmitting a first packet of the one or more generated packets to the second endpoint via the data network; and
   transmitting a second packet of the one or more generated packets to the second endpoint via the token distribution network.

6. The tangible, non-transitory computer-readable media of claim 1, wherein using the identification data for the second endpoint in the service token and the key from the traffic token to generate one or more packets comprising the data payload comprises:

using the key from the traffic token to encrypt the data payload;

generating header extension data comprising one or more of (i) a Service Token ID of the service token associated with the second endpoint, (ii) a Traffic Token ID of the traffic token required for data communications between the first endpoint and the second endpoint, and (iii) a digital signature generated by a private key of the first endpoint; using the key from the traffic token to encrypt the header extension data; and generating one or more packets, wherein individual packets comprise (i) an IP packet header, (ii) the encrypted header extension data, and (iii) at least a portion of the encrypted data payload.

7. The tangible, non-transitory computer-readable media of claim 1, wherein the method further comprises:

receiving, by the first endpoint, an incoming packet from the second endpoint via the data network, wherein the incoming packet comprises (i) an IP header comprising a source IP address, (ii) an encrypted first data portion comprising header extension data, and (iii) an encrypted payload portion comprising data intended for the first endpoint;

in response to receiving the incoming packet from the second endpoint via the data network, querying a memory comprising a correlation between source IP addresses, service tokens, and traffic tokens to obtain a decryption key corresponding to the source IP address;

using the decryption key to obtain a Service Token ID, a Traffic Token ID, and a digital signature from the incoming packet by decrypting the encrypted header extension data portion of the incoming packet;

determining whether the traffic token corresponding to the Traffic Token ID in the header extension data has not expired;

in response to determining that the traffic token corresponding to the Traffic Token ID in the header extension data has not expired, using the Service Token ID to obtain a public key of the second endpoint from the memory, and using the public key of the first endpoint to determine whether the second endpoint generated the digital signature with a private key of the second endpoint; and in response to determining that the second endpoint generated the digital signature with the private key of the second endpoint, saving the encrypted payload portion comprising data intended for the second endpoint for subsequent (i) reassembly with one or more other encrypted payload portions of other incoming packets to reproduce a complete encrypted payload and (ii) decryption of the complete encrypted payload to obtain the data intended for the first endpoint.

8. The tangible, non-transitory computer-readable media of claim 7, wherein the method further comprises:

in response to determining that the traffic token corresponding to the Traffic Token ID in the header extension data has expired, waiting a predetermined period of time to receive a valid traffic token before conducting further packet processing.

9. The tangible, non-transitory computer-readable media of claim 7, wherein the method further comprises:

in response to determining that the second endpoint did not generate the digital signature with the private key of the second endpoint, discarding the packet and sending a report to the token manager and a security analytics node.

10. A first endpoint device comprising:

one or more processors; and tangible, non-transitory computer-readable memory comprising instructions encoded therein, wherein the instructions, when executed by one or more processors, cause the first endpoint to perform functions comprising:

receiving one or more tokens via a token distribution network, wherein the one or more tokens comprise identification data for a second endpoint and an encryption key;

determining that a requirement exists to transmit a data payload from the first endpoint to the second endpoint;

in response to determining that the requirement exists to transmit the data payload from the first endpoint to the second endpoint, using the identification data for the second endpoint and the encryption key to generate one or more packets comprising the data payload, wherein an individual packet comprises an IP header, encrypted header extension data, and at least a portion of an encrypted data payload, wherein the encrypted data payload comprises data intended for the second endpoint; and transmitting one or more of the generated packets to the second endpoint via a data network that is separate from the token distribution network.

11. The first endpoint device of claim 10, wherein transmitting one or more of the generated packets to the second endpoint via a data network that is separate from the token distribution network comprises:

transmitting a first packet of the one or more generated packets to the second endpoint via the token distribution network; and transmitting a second packet of the one or more generated packets to the second endpoint via the data network.

12. The first endpoint of claim 11, wherein the functions further comprise:

receiving an incoming packet from the second endpoint via the data network, wherein the incoming packet comprises (i) an IP header, (ii) encrypted header extension data, and (iii) at least a portion of an encrypted data payload, wherein the encrypted data payload comprises data intended for the first endpoint;

in response to receiving the incoming packet from the second endpoint via the data network, obtaining a decryption key based on data in the IP header;

using the decryption key to decrypt the encrypted header extension data portion of the incoming packet;

using the decrypted header extension data to confirm that the second endpoint generated the incoming packet;

storing the at least a portion of the encrypted data payload for subsequent (i) reassembly with one or more other encrypted payload portions of other incoming packets to reproduce a complete encrypted data payload and (ii) decryption of the complete encrypted data payload to obtain the data intended for the first endpoint.

13. The first endpoint device of claim 10, wherein using the identification data for the second endpoint and the encryption key to generate one or more packets comprising the data payload comprises:

using the encryption key to encrypt the data payload;

generating IP header data comprising the IP address of the second endpoint;

generating header extension data comprising one or more of (i) information relating to the one or more tokens and (ii) a digital signature generated via a private key of the first endpoint; using the encryption key to encrypt the header extension data;

using the encryption key to encrypt the data payload; and generating one or more packets for transmission to the second endpoint, wherein individual packets comprise (i) the IP header data, (ii) the encrypted header extension data, and (iii) at least a portion of the encrypted data payload.

14. A system comprising:

a first endpoint communicatively coupled to a data network and a token distribution network that is separate from the data network;

a second endpoint communicatively coupled to the data network and the token distribution network;

wherein the first endpoint is configured to (i) receive one or more tokens via the token distribution network, wherein the one or more tokens comprise identification data for the second endpoint and a first encryption key, (ii) use the identification data for the second endpoint and the first encryption key to generate one or more packets, wherein an individual packet comprises an IP header, encrypted header extension data, and at least a portion of an encrypted data payload, wherein the encrypted data payload comprises data intended for the second endpoint, and (iii) transmit one or more of the generated packets to the second endpoint via the data network.

15. The system of claim 14, wherein the second endpoint is configured to (i) receive the one or more generated packets via the data network, (ii) obtain a first decryption key based on data in the IP header of each packet, (ii) use the decryption key to decrypt the header extension data of each packet, (iii) use the decrypted header extension data of each packet to confirm, for each packet, that the first endpoint generated the packet, (iv) use the portions of the encrypted data payload in each packet to reassemble the encrypted data payload, and (v) use the decryption key to decrypt the reassembled payload.

16. The system of claim 14, wherein to transmit one or more of the generated packets to the second endpoint via the data network, the first endpoint is configured to:

(i) transmit a first packet of the one or more generated packets to the second endpoint via the data network and (ii) transmit a second packet of the one or more generated packets to the second endpoint via the token distribution network.

17. The system of claim 14, further comprising:

a token manager configured to generate tokens and transmit the tokens to the first endpoint and the second endpoint via the token distribution network.

18. The system of claim 14, wherein the first endpoint is communicatively coupled to the data network via a first network interface, and wherein the first endpoint is communicatively coupled to the token distribution network via a second network interface, wherein the first network interface is at least one of logically or physically separate from the second network interface.

19. The system of claim 14, wherein the first endpoint is communicatively coupled to an IoT device, and wherein the second endpoint is communicatively coupled to an application server associated with the IoT device.

20. The system of claim 14, wherein the token distribution network uses Blockchain technology.

* * * * *